United States Patent [19]

Burnett

[11] 4,084,665
[45] Apr. 18, 1978

[54] DISC BRAKE AND MOUNTING MEANS THEREFOR

[75] Inventor: Richard Thomas Burnett, South Bend, Ind.

[73] Assignee: The Bendix Corporation, South Bend, Ind.

[21] Appl. No.: 734,908

[22] Filed: Oct. 22, 1976

[51] Int. Cl.² .............................................. F16D 65/02
[52] U.S. Cl. ................... 188/73.3; 188/73.5
[58] Field of Search .................. 188/73.3, 73.4, 73.5, 188/73.6, 72.4, 205 A, 205 R

[56] References Cited

U.S. PATENT DOCUMENTS

| 3,375,906 | 4/1968 | Hayes | 188/73.3 |
| 3,616,877 | 11/1971 | Collins | 188/73.3 |
| 3,648,807 | 3/1972 | Lottridge et al. | 188/73.3 |
| 3,805,925 | 4/1974 | Schoenhenz | 188/73.3 |
| 3,838,753 | 10/1974 | Kestermeier et al. | 188/73.3 |

FOREIGN PATENT DOCUMENTS

| 2,514,383 | 11/1975 | Germany | 188/73.3 |

*Primary Examiner*—Duane A. Reger
*Assistant Examiner*—Douglas C. Butler
*Attorney, Agent, or Firm*—Paul David Schoenle; Ken C. Decker

[57] ABSTRACT

A disc brake includes a rotor with friction surfaces, a caliper cooperating with a pair of friction elements to engage the friction elements with the rotor friction surfaces when a brake application is effected and a torque member supporting the caliper via a pin and elastomeric ring construction. The pin includes recesses for carrying elastomeric rings, which resiliently engage the caliper and the torque member to dispose the pin in spaced relation to the caliper and torque member. A groove in the pin forms an interference fit with a washer, which is releasably secured to the torque member, to limit the axial movement of the pin relative to the torque member. The elastomeric rings are deformable axially to permit axial movement of the caliper relative to the pin with only limited sliding of the caliper on the elastomeric rings and are deformable radially to permit the pin to engage the torque member and the caliper. The elastomeric rings remain engaged to the torque member and the caliper to prevent rattles between the caliper and the torque member.

9 Claims, 7 Drawing Figures

DISC BRAKE AND MOUNTING MEANS THEREFOR

BACKGROUND OF THE INVENTION

Floating caliper disc brakes slidably mount a caliper on a fixed torque member. When a brake application is effected, a pair of friction elements are urged into engagement with a rotor to retard the rotation of the rotor, which rotates with a wheel assembly. Various pin or key arrangements are interposed between the torque member and the caliper to provide for axial sliding of the caliper relative to the torque member as the caliper urges the pair of friction elements into engagement with the rotor and to transfer the braking torque, developed between the friction elements and the rotor, from the caliper to the torque member.

These pin-like arrangements have proven to be rather expensive to manufacture and have been complicated in structure in order to perform the sliding and transfer functions between the caliper and the torque member.

SUMMARY OF THE INVENTION

The present invention relates to the connection between a torque member and a caliper. A pin is disposed in associated axial slots on the torque member and the caliper to interlock the caliper to the torque member. Recesses on the pin receive elastomeric rings, which resiliently engage the torque member and the caliper. The elastomeric rings dispose the pin, the torque member and the caliper in spaced relation to each other during axial movement of the caliper relative to the torque member and are deformable during a brake application to engage the caliper with the torque member on surfaces adjacent the axial slots, so that braking forces between the friction elements and the rotor are transmitted from the caliper to the torque member.

The pin recesses include tapered side walls to provide for axial deformation of the radial outer portion of the elastomeric rings so that the radial outer portion of the elastomeric rings can remain substantially axially fixed to the caliper when the caliper moves axially relative to the torque member, with only a slight amount of sliding of the rings relative to the caliper.

Moreover, the pin includes a groove for receiving a washer to form an interference fit, so that the pin is free to move axially through the axial clearance between the washer and groove.

DETAILED DESCRIPTION

Figure 2:
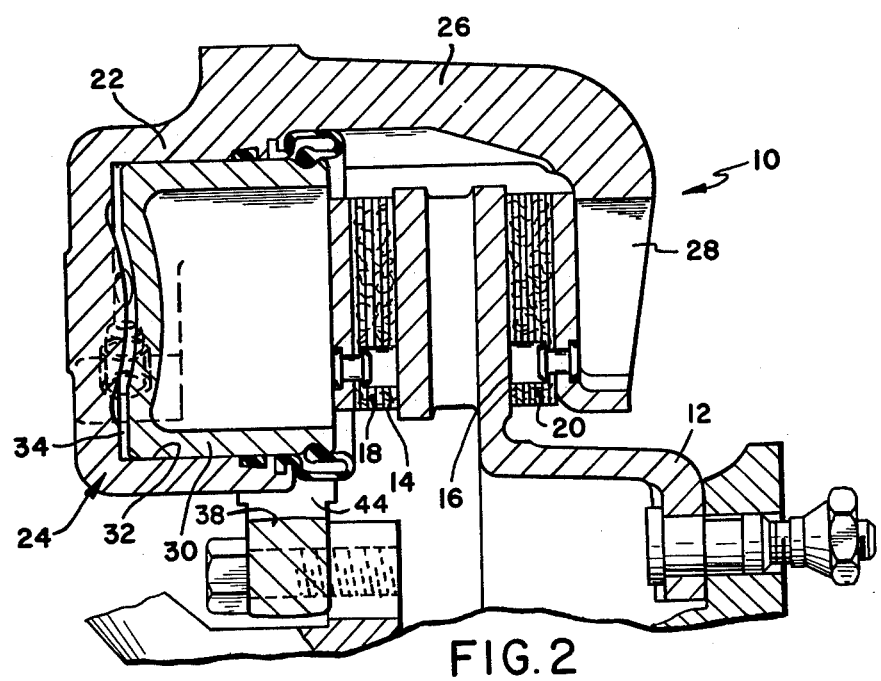
FIG. 2 is a cross-sectional view taken substantially along line 2—2 of FIG. 1.

Referring to FIG. 2, a disc brake indicated generally by the numeral 10 includes a rotor 12 rotating with an axle assembly and having a pair of opposed friction faces 14 and 16. A pair of friction elements 18, 20 are disposed adjacent the friction faces 14 and 16, respectively. The friction elements 18 and 20 are urged into braking engagement with their corresponding friction faces 14 and 16 when a brake application is effected. A caliper 22 includes a fluid motor portion 24 disposed adjacent the friction face 14, a bridge portion 26 that traverses the periphery of the rotor 12, and a radially inwardly extending reaction portion 28 which is disposed adjacent the face 16. The fluid motor portion 24 includes a piston 30 slidably arranged in a bore 32 defined within caliper 22. Fluid is communicated to the variable volume chamber 34 defined between the end of the piston and corresponding end of the bore 32 when a brake application is effected, to urge the piston 30 toward the rotor 12. When the brake is subsequently released, the piston 30 is returned to its brake-release position.

Figure 1:
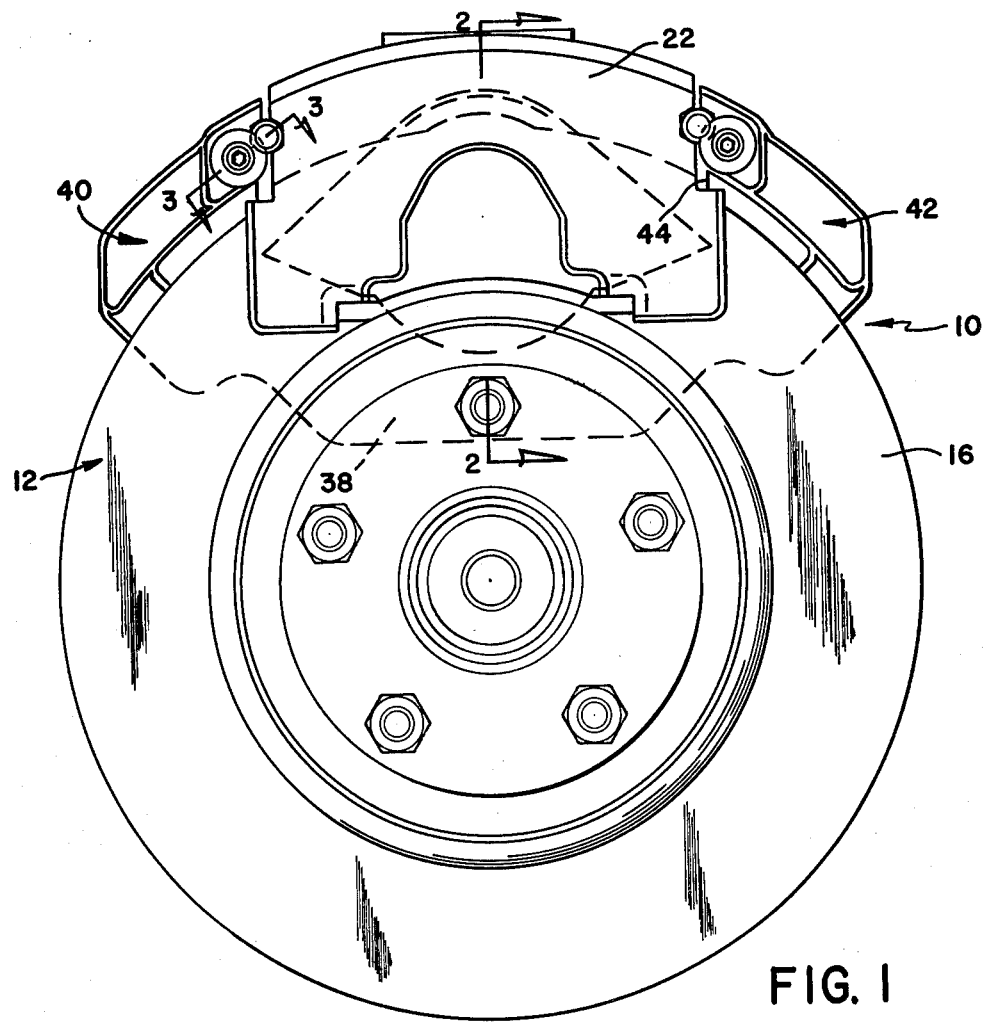
FIG. 1 is a side elevation of a disc brake made pursuant to the present invention.

Turning to FIG. 1, the caliper 22 is mounted for axial movement with respect to the rotor 12 by a torque member 38, which is secured to a non-rotating portion of the axle assembly (not shown). The torque member 38 includes a pair of circumferentially spaced arms 40, 42 that define a recess 44 therebetween.

Since the caliper mounting area of torque member 38 is symmetrical, the circumferentially spaced arms 40 and 42 are similar, and therefore only the arm 40 will be described in detail, it being understood that the arm 42 is symmetrically opposite the arm 40.

Figure 3:
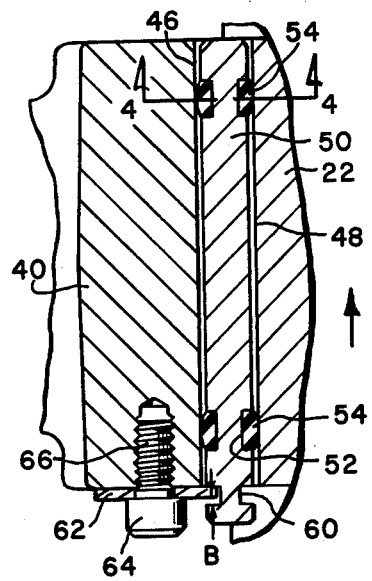
FIG. 3 is a cross-sectional view taken substantially along line 3—3 of FIG. 1.
Figure 4:
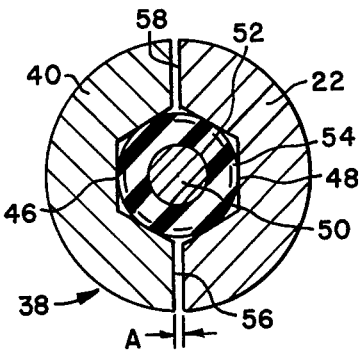
FIG. 4 is an enlarged cross-sectional view taken substantially along line 4—4 of FIG. 3.

Turning to FIGS. 3 and 4, the torque member arm 40 and the caliper 22 include matching semi-hexagonal slots 46 and 48, respectively. In accordance with the invention a cylindrical pin or key 50 is disposed between the torque member arm 40 and the caliper 22 within the matching semi-hexagonal slots 46 and 48. Recesses at 52 on the pin 50 receive elastomeric rings 54, which rings resiliently engage the slots 46 and 48 on the respective torque member arm 40 and the caliper 22.

In the brake-release position, viewing FIG. 4, abutment surface 56 on the torque member arm 40 is spaced from an abutment surface 58 on the caliper 22 to form a clearance A between the torque member 38 and the caliper 22. This clearance is maintained, in the brake-release position, by the engagement of the elastomeric ring 54 with the torque member arm 40 and the caliper 22. This clearance will be taken up on one side of the caliper 38 when the brake is applied and the caliper will anchor on the torque arm through these abutment surfaces. With the caliper anchored to the torque member the diameter of pin 50 is less than the inner diameter of the matching hexagonal slots so that the pin 50 remains in spaced relation to the torque member and the caliper.

A groove 60 on the pin 50 receives a washer 62, which is secured to the torque member arm 40 by means of a bolt 64, threadably engaging the bore 66 in the torque member arm near the semi-hexagonal slot 46. The washer 62 forms an interference with the groove 60 by means of the axial clearance B between the washer and groove. Consequently, during braking the pin is free to move axially through the clearance B.

Figure 5:
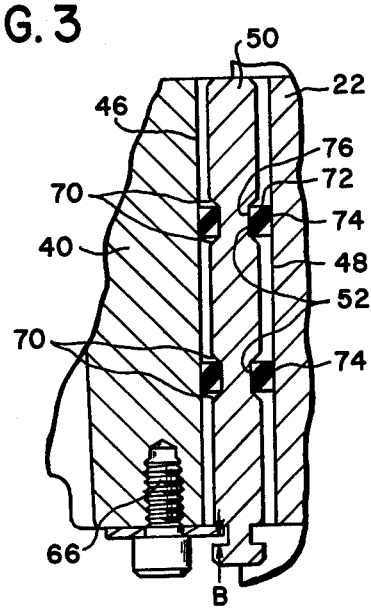
FIG. 5 is a cross-sectional view similar to FIG. 3 illustrating a modification of the present invention.

In the embodiment of FIG. 5, the pin 50 includes recesses at 52, which recesses are provided with tapered side walls at 70 that flare outwardly from the bottom of recesses 52. Rectangular elastomeric rings 72 are received within the recesses 52 and the radial outer portion of the rings at 74 is tightly engaged with the semi-hexagonal slots 46 and 48, while the radial inner portion at 76 is tightly engaged with the inner diameter of recesses 52. Consequently, axial movement of caliper 22 deforms the rings 72 to position the same adjacent the top or bottom tapered side walls 70, viewing FIG. 5, and depending on the direction of axial movement of caliper 22. It is noted that the caliper 22 can move axially relative to the pin 50 and torque member arm 40 without any sliding contact between the caliper 22, pin 50 and torque member arm provided the axial movement of the caliper 22 is limited to a relatively small distance, such as the running clearance between the pair of friction elements 18 and 20 and the rotor 12. In addition, the elastomeric rings remain substantially fixed to the pin 50 and the caliper 22, as the axial movement of the caliper 22 deforms the elastomeric rings toward the tapered side walls 70, rather than slide the caliper 22 over the elastomeric rings 72. However, as the friction elements wear, a small amount of sliding occurs between the elastomeric rings 72, the caliper and the torque member.

Figure 6:
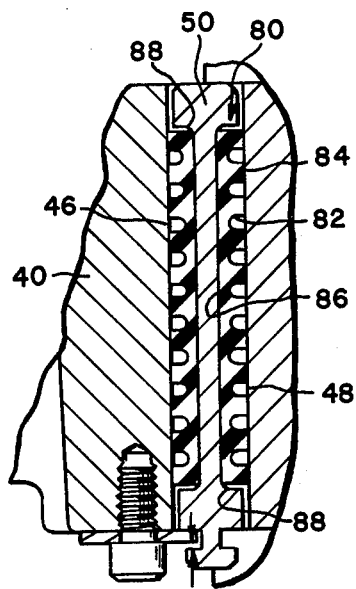
FIG. 6 is a cross-sectional view similar to FIG. 3 illustrating a modification of the present invention.

In a similar manner, the embodiment of FIG. 6 shows an elongated elastomeric ring 80 on the pin 50 having a plurality of grooves at 82, which grooves define a plurality of ridges 84 that resiliently engage the semi-hexagonal slots 46 and 48 on the torque member arm 40 and the caliper 22. The elongated elastomeric ring 80 is received in an elongated recess 86 that terminates in tapered side walls at 88 for receiving the axial deformation of the radial outer portion of the ridges 84.

Figure 7:
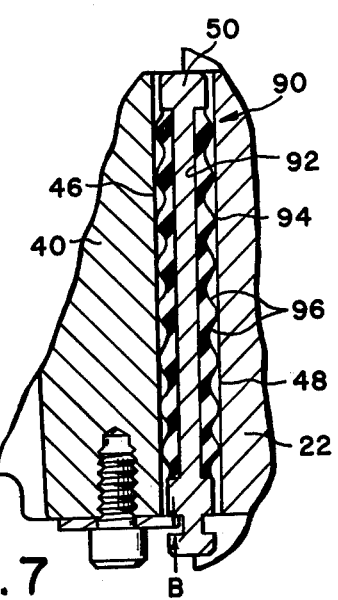
FIG. 7 is a cross-sectional view similar to FIG. 3 illustrating a modification of the present invention.

The embodiment of FIG. 7 shows a pin 50 carrying an elongated elastomeric ring 90 in an elongated recess 92. The radial outer portion of the elastomeric ring 90 is provided with ridges 94 and grooves 96 that are curved. The ridges 94 resiliently engage the semi-hexagonal slots 46 and 48 on the respective torque member arm 40 and caliper 22 and the grooves 96 permit axial deformation of the ridges 94, when the caliper 22 moves axially, so that the ridges 94 remain substantially axially fixed to the caliper 22.

MODE OF OPERATION

When a brake application is effected, high pressure fluid is admitted into the variable volume chamber 34 where it urges the piston 30 toward the friction face 14, thereby urging the friction element 18 into frictional engagement with the friction face 14. As is well known in the art, reaction forces acting through bridge 26 and the reaction portion 28 of the caliper 22 will also urge the friction element 20 into frictional engagement with the friction face 16 to brake or retard the rotation of the rotor 12.

Viewing FIGS. 3, 5, 6, and 7, the reaction forces acting through bridge 26 move the caliper 22 in the direction indicated by the arrow when a brake application is effected. In view of the clearance between abutment surfaces 56 and 58, which clearance is maintained by the elastomeric rings 54, 72, 80 and 90 so long as the braking torque is below that developed when both friction elements 18 and 20 are fully engaged with the rotor 12, the caliper 22 moves axially without sliding against the torque member arm 40. Also, the pin 50 is free to move axially through a distance equal to the clearance B. When both friction elements 18 and 20 are fully engaged with the rotor 12, the braking torque is transmitted through the caliper 22 to urge the caliper 22 radially toward either torque member arm 40 or 42, depending on the direction of rotation of the rotor 12. The caliper 22 moves angularly to the left, viewing FIGS. 1 and 3 to deform the elastomeric rings 54 until the abutment surface 58 on the caliper 22 contacts the abutment surface 56 on the torque member 38, whereupon the braking torque is transmitted to the torque member 38 when the friction elements are fully engaged with the rotor.

Consequently, the present invention provides for axial movement of the caliper 22 relative to the torque member arm 40 without sliding contact therebetween and also provides for slight angular movement of the caliper 22 during a full brake application to deform the elastomeric rings 54, 72, 80 and 90 to urge the abutment surface 58 into contact with the abutment surface 56.

Moreover, the elastomeric rings of the present invention are flexible or deformable when the caliper 22 moves axially relative to the pin 50, so that the radial outer portion at 74 of elastomeric ring 50 in FIG. 5, for example, remains substantially fixed to the axially moving caliper 22 while the radial inner portion at 76 remains substantially fixed to pin 50, which may move a limited axial distance through the axial clearance B.

I claim:
1. A disc brake comprising:
a rotor rotating with an axle assembly and having friction faces on opposite sides thereof;
a caliper cooperating with a pair of friction elements to urge the pair of friction elements into engagement with the friction faces on said rotor to retard the rotation of said rotor;
a torque member secured to a nonrotating portion of the axle assembly, said caliper and said torque member having substantially matching slots; and
a pair of pins disposed within said matching slots between said torque member and said caliper, each of said pair of pins having a recess within said matching slots for receiving an elastomeric ring, which ring resiliently engages said torque member slot and said caliper slot to dispose each of said pair of pins in spaced relation to said torque member and said caliper in a brake-release position.

2. The disc brake of claim 1 in which each of said pair of pins includes a groove and a washer secured to said torque member extending into said groove to axially interlock said pair of pins to said torque member.

3. The disc brake of claim 1 in which the elastomeric ring engages said torque member slot and said caliper slot to dispose said torque member in spaced relation to said caliper and to each of said pair of pins.

4. A disc brake comprising:
a rotor rotating with an axle assembly and having friction faces;
a caliper cooperating with a pair of friction elements to urge the pair of friction elements into engagement with the friction faces on said rotor to retard the rotation of said rotor;
a torque member secured to a nonrotating portion of the axle assembly, said torque member and said caliper having substantially matching slots; and
a pair of pins disposed within said matching slots between said torque member and said caliper and cooperating with said torque member to support said caliper relative to said torque member, each of said pair of pins carrying a plurality of elastomeric rings within said matching slots, which rings are deformable axially to permit axial movement of said caliper relative to said torque member and radially to permit angular movement of said caliper relative to said torque member.

5. A disc brake comprising:
a rotor rotating with an axle assembly and having friction faces on opposite sides thereof;
a caliper cooperating with a pair of friction elements to urge the pair of friction elements into engagement with the friction faces on said rotor to retard the rotation of said rotor;
a torque member secured to a nonrotating portion of the axle assembly; and
a pair of pins disposed between said torque member and said caliper, said pair of pins each having a recess for receiving an elastomeric ring, which ring resiliently engages said torque member and said caliper to dispose said pair of pins in spaced relation to said torque member and said caliper in a brake-release position, said pair of pins each including a plurality of recesses and a plurality of elastomeric rings being carried by the recesses.

6. A disc brake comprising:
a rotor rotating with an axle assembly and having friction faces on opposite sides thereof;
a caliper cooperating with a pair of friction elements to urge the pair of friction elements into engagement with the friction faces on said rotor to retard the rotation of said rotor;
a torque member secured to a nonrotating portion of the axle assembly; and
a pair of pins disposed between said torque member and said caliper, said pair of pins each having a recess for receiving an elastomeric ring, which ring resiliently engages said torque member and said caliper to dispose said pair of pins in spaced relation to said torque member and said caliper in a brake-release position, each said elastomeric ring being axially fixed to said pair of pins at its radially inner portion and the radially outer portion of the elastomeric ring being deformable to remain axially fixed to said caliper when said caliper moves axially relative to said pair of pins.

7. A disc brake comprising:
a rotor rotating with an axle assembly and having friction faces on opposite sides thereof;
a caliper cooperating with a pair of friction elements to urge the pair of friction elements into engagement with the friction faces on said rotor to retard the rotation of said rotor;
a torque member secured to a nonrotating portion of the axle assembly; and
a pair of pins disposed between said torque member and said caliper, said pair of pins each having a recess for receiving an elastomeric ring, which ring resiliently engages said torque member and said caliper to dispose said pair of pins in spaced relation to said torque member and said caliper in a brake-release position, each said elastomeric ring including a plurality of ridges intermittent a plurality of grooves, said ridges being deformable to move with said caliper when said caliper moves relative to said pair of pins.

8. A disc brake comprising:
a rotor rotating with an axle assembly and having friction faces;
a caliper cooperating with a pair of friction elements to urge the pair of friction elements into engagement with the friction faces on said rotor to retard the rotation of said rotor;
a torque member secured to a nonrotating portion of the axle assembly; and
a pair of pins disposed between said torque member and said caliper and cooperating with said torque member to support said caliper relative to said torque member, said pair of pins each carrying a plurality of elastomeric rings, which rings are deformable axially to permit axial movement of said caliper relative to said torque member and radially to permit angular movement of said caliper relative to said torque member, said pair of pins each including recesses for carrying the elastomeric rings, said recesses having tapered side walls to provide for axial deformation of the radial outer portion of the elastomeric rings when said caliper moves axially relative to said pair of pins and the radial outer portion of the elastomeric rings remains axially fixed to said caliper.

9. A disc brake comprising:
a rotor rotating with an axle assembly and having friction faces;
a caliper cooperating with a pair of friction elements to urge the pair of friction elements into engagement with the friction faces on said rotor to retard the rotation of said rotor;
a torque member secured to a nonrotating portion of the axle assembly, said torque member and said caliper having substantially matching slots; and
a pair of pins disposed within said matching slots between said torque member and said caliper and cooperating with said torque member in order to support said caliper, each of said pair of pins carrying means within said matching slots to position the pair of pins in spaced relation to said caliper and said torque member and each of said pair of pins being movable axially relative to said torque member and said caliper when said caliper moves axially relative to said torque member;
each of said pair of pins including a groove for receiving a washer which is secured to said torque member, said washer forming an interference fit with said groove to define an axial clearance therebetween to limit the axial movement of each of said pair of pins to the axial clearance.

* * * * *